(12) United States Patent
Lee et al.

(10) Patent No.: US 9,843,079 B2
(45) Date of Patent: Dec. 12, 2017

(54) METAL-AIR FUEL CELL BASED ON SOLID OXIDE ELECTROLYTE EMPLOYING METAL NANOPARTICLE AS FUEL

(71) Applicant: GWANGJU INSTITUTE OF SCIENCE AND TECHNOLOGY, Gwangju (KR)

(72) Inventors: Jaeyoung Lee, Gwangju (KR); HyungKuk Ju, Gwangju (KR); Jae Kwang Lee, Gwangju (KR); Jin Won Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 169 days.

(21) Appl. No.: 13/933,816

(22) Filed: Jul. 2, 2013

(65) Prior Publication Data

US 2014/0004430 A1   Jan. 2, 2014

(30) Foreign Application Priority Data

Jul. 2, 2012   (KR) .................. 10-2012-0071941

(51) Int. Cl.

| | | |
|---|---|---|
| *H01M 12/06* | (2006.01) | |
| *H01M 4/38* | (2006.01) | |
| *B82Y 99/00* | (2011.01) | |
| *H01M 4/02* | (2006.01) | |
| *B82Y 30/00* | (2011.01) | |

(52) U.S. Cl.
CPC ............ *H01M 12/06* (2013.01); *H01M 4/38* (2013.01); *H01M 4/387* (2013.01); *B82Y 30/00* (2013.01); *B82Y 99/00* (2013.01); *H01M 2004/021* (2013.01); *H01M 2004/023* (2013.01); *Y10S 977/773* (2013.01); *Y10S 977/948* (2013.01)

(58) Field of Classification Search
CPC ........ H01M 12/06; H01M 12/00; H01M 4/38; H01M 4/387; H01M 2004/021; H01M 2004/023; B82Y 99/00
See application file for complete search history.

(56) References Cited

U.S. PATENT DOCUMENTS

| | | | | |
|---|---|---|---|---|
| 8,518,598 | B1 * | 8/2013 | Yamanis | ............. H01M 8/0662 |
| | | | | 429/408 |
| 2002/0142203 | A1 * | 10/2002 | Ma et al. | ......................... 429/27 |
| 2004/0038120 | A1 * | 2/2004 | Tsai et al. | ....................... 429/66 |
| 2008/0003481 | A1 * | 1/2008 | Ecer | ................................ 429/33 |
| 2010/0092832 | A1 * | 4/2010 | Lee et al. | ........................ 429/33 |
| 2010/0209816 | A1 * | 8/2010 | Kwak et al. | .................. 429/488 |
| 2010/0330450 | A1 * | 12/2010 | Huang et al. | ................ 429/480 |
| 2011/0250524 | A1 * | 10/2011 | Ichikawa | ...................... 429/482 |

(Continued)

*Primary Examiner* — Jeremiah Smith
(74) *Attorney, Agent, or Firm* — Hauptman Ham, LLP

(57) ABSTRACT

Disclosed is a metal-air fuel cell based on a solid oxide electrolyte employing metal nanoparticles as fuel. The metal-air fuel cell includes an anode, a cathode, a solid oxide electrolyte and a metal fuel, wherein the metal fuel comprises metal nanoparticles having an average particle diameter ranging from 1 nm to 100 nm. The metal nanoparticles have a low melting point and provide high reactivity. Thus, the metal-air fuel cell forms a metal molten phase at a relatively low temperature thereby improving contactability and has improved reactivity to promote oxidation, thereby enabling highly efficient power generation.

11 Claims, 3 Drawing Sheets

(56) References Cited

U.S. PATENT DOCUMENTS

2012/0009491 A1* 1/2012 Friesen ................ H01M 12/06
                                                    429/418
2012/0129058 A1* 5/2012 Litzinger .............. H01M 12/08
                                                    429/403

* cited by examiner

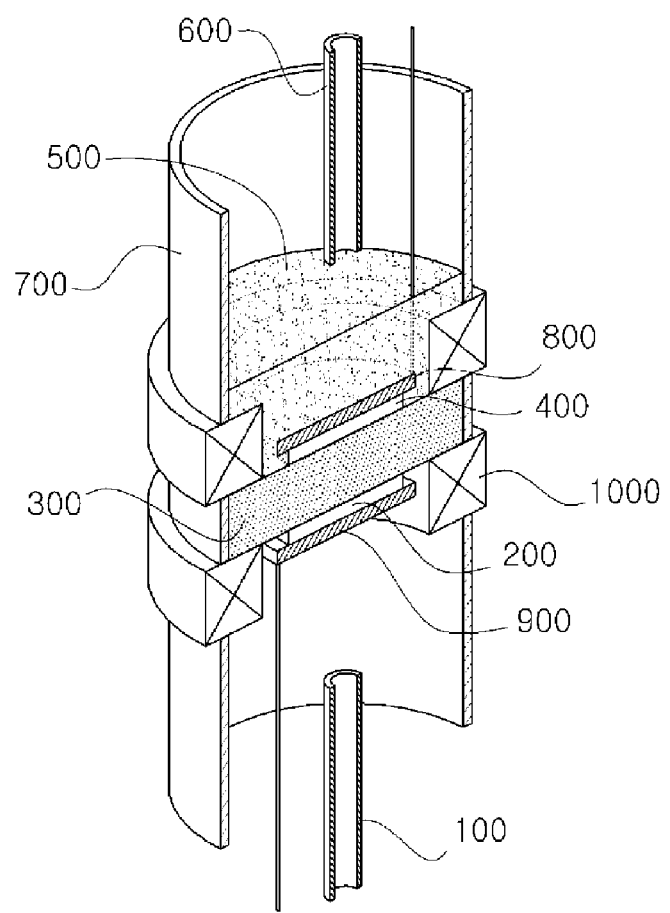
[Fig. 1]

[Fig. 2]
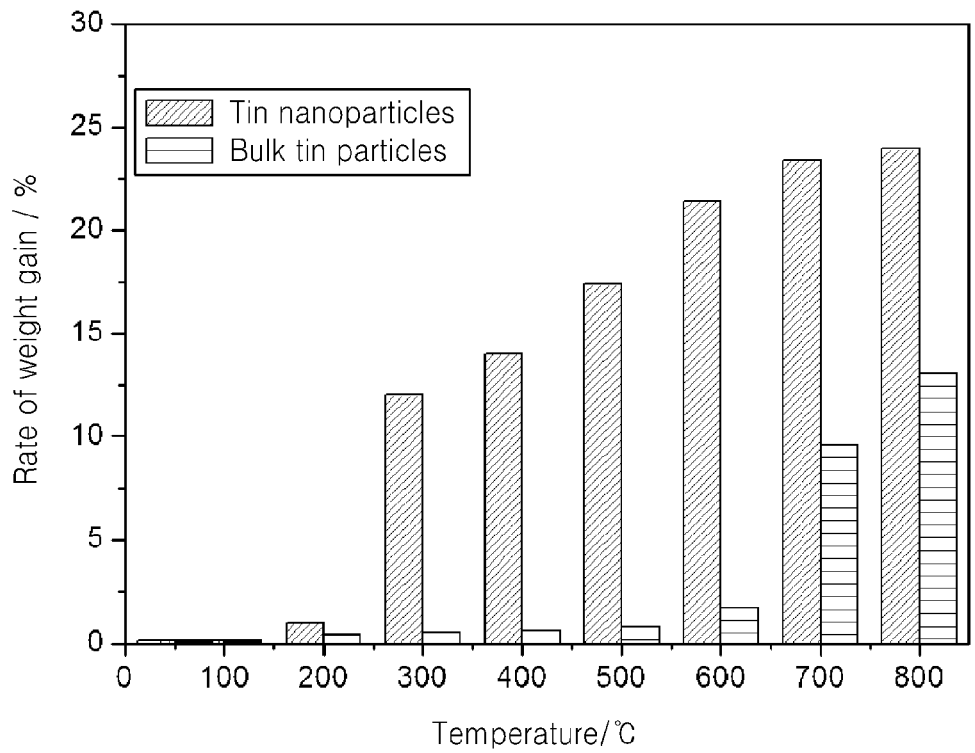
[Fig. 3]
| Temperature | OCV of tin nanoparticles | OCV of bulk tin particles |
|---|---|---|
| 550℃ | 0.5 V | 0.1 V |
| 600℃ | 0.53 V | 0.1 V |
| 650℃ | 0.75 V | 0.56 V |
| 700℃ | 0.96 V | 0.6 V |
| 750℃ | 0.97 V | 0.45 V |

[Fig. 4]
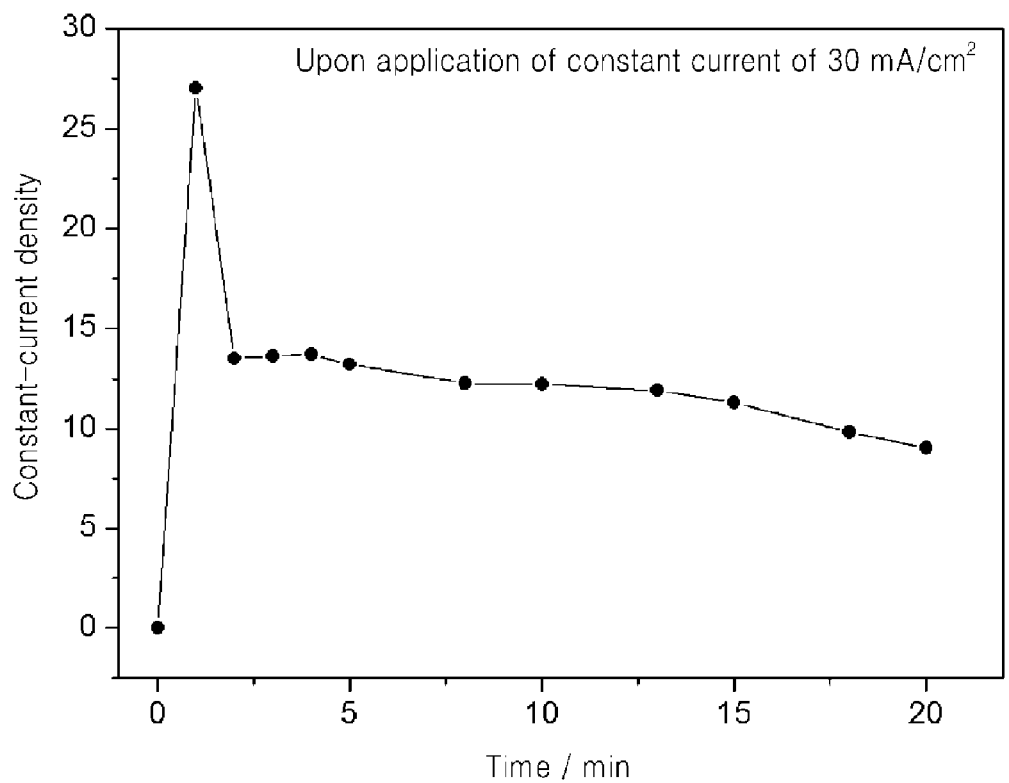

METAL-AIR FUEL CELL BASED ON SOLID OXIDE ELECTROLYTE EMPLOYING METAL NANOPARTICLE AS FUEL

CROSS-REFERENCE TO RELATED APPLICATION

This application claims priority to Korean Patent Application No. 10-2012-0071941 filed on 2 Jul., 2012, and all the benefits accruing therefrom under 35 U.S.C. §119, the contents of which is incorporated by reference in its entirety.

BACKGROUND

1. Technical Field

The present invention relates to a metal-air fuel cell based on a solid oxide electrolyte employing metal nanoparticles as fuel.

2. Description of the Related Art

A fuel cell is an electrochemical device that generates electric energy based on change in free energy of fuel caused by oxidation of the fuel. Currently, various types of fuel cells, such as a phosphoric acid fuel cell, a polymer electrolyte membrane fuel cell, a molten carbonate fuel cell, a metal-air fuel cell, a solid oxide fuel cell, and the like, are used in the art.

Among these, a metal-air fuel cell is named as such because reactants employed therein include air or oxygen and a metal. In the metal-air fuel cell, air or oxygen injected from a cathode is ionized while passing through a cathode catalyst, and oxidizes the metal in an anode, thereby generating electrons. Thus, since the metal-air fuel cell can be operated simply by filling an anode material, this type of fuel cell has higher energy density than other types of fuel cell systems, can be operated at room temperature to be used for various application fields, and does not generate by-products other than metal oxides to achieve eco-friendly production of electric power.

However, the air-metal fuel cell has a short lifespan due to loss of a liquid electrolyte and evaporation of water resulting from air injection and oxidation. To solve this problem, a shut-off device is provided to the fuel cell to supplement water or an electrolyte. In this case, however, a user is exposed to a danger of directly handling a strongly basic liquid electrolyte. In addition, some components of the fuel cell can be corroded by the strongly basic liquid electrolyte.

On the other hand, a solid oxide fuel cell (SOFC) is one classified according to properties of electrolyte and accelerates reaction inside an anode under high temperature conditions of 600° C. to 1000° C. Thus, unlike the phosphoric acid fuel cell or the polymer electrolyte membrane fuel cell, the solid oxide fuel cell can provide very high energy conversion efficiency without using a platinum catalyst, which is an expensive material, and is not significantly influenced by reactivity of substances, thereby enabling use of various materials such as natural gas, coal gas, and the like, in addition to hydrogen. Further, the solid oxide fuel cell does not suffer from problems relating to corrosion and loss of an electrolyte, and thus can overcome the problems caused by the liquid electrolyte of the metal-air fuel cell.

Such a solid oxide fuel cell is composed of unit cells each including an electrolyte having high oxygen ion conductivity, and a cathode and an anode formed on opposite sides of the electrolyte. As fuels and raw materials for the solid oxide fuel cell, various materials may be used. For example, in the metal-air fuel cell system, oxygen ions are generated by reduction of oxygen supplied into the cathode, and moved to an anode catalyst through a solid electrolyte to react with a metal provided as a fuel, thereby producing metal oxides and electrons. Except for the use of the solid electrolyte as the electrolyte, this type of solid oxide-based metal-air fuel cell has a power generation mechanism of a typical metal-air fuel cell, and reactions in the cathode, solid electrolyte and anode of the fuel cell can be generally expressed as follows:

Cathode: $O_2 + 4e^- \rightarrow 2O^{2-}$

Solid electrolyte: $2O^{2-}$ movement

Anode: $Metal + 2O^{2-} \rightarrow Metal\ oxide + 4e^-$

Overall reaction: $Metal + O_2 \rightarrow Metal\ oxide$

Not only does such a solid oxide-based metal-air fuel cell solve the problem of the conventional metal-air fuel cell suffering from loss of the liquid electrolyte, but also allows application of inherent merits of the solid electrolyte fuel cell which promotes oxidation under high temperature operation conditions. However, as a major factor deteriorating power generation efficiency, the solid oxide-based metal-fuel cell suffers from high resistance due to a low degree of contact between the metal fuel and the catalyst, and there is a need for fuel materials having various physical chemical characteristics to solve such problems.

BRIEF SUMMARY

It is one aspect of the present invention to provide a metal-air fuel cell based on a solid oxide employing a metal fuel having improved reactivity and contactability.

In accordance with one aspect of the present invention, a metal-air fuel cell based on a solid oxide electrolyte includes an anode, a cathode, a solid oxide electrolyte and a metal fuel, wherein the metal fuel includes metal nanoparticles having an average particle diameter ranging from 1 nm to 100 nm.

In one embodiment of the invention, the metal fuel may be a gel phase metal fuel including metal nanoparticles dispersed in an organic solvent.

In another embodiment of the invention, the organic solvent may be ethylene glycol.

In a further embodiment of the invention, the metal fuel may be a metal having a melting point of 250° C. to 1000° C.

In yet another embodiment of the invention, the metal fuel may be a metal selected from the group consisting of Sn, $V_2O_5$, In, Sb, Pb, Bi, Ag, and mixtures thereof.

In yet another embodiment of the invention, the metal fuel may be Sn.

In yet another embodiment of the invention, the anode may be a porous nickel-gadolinium doped cerium oxide electrode or a porous nickel-yttria stabilized zirconia electrode.

In yet another embodiment of the invention, the electrolyte may be yttrium-stabilized zirconia.

In yet another embodiment of the invention, the cathode may be composed of lanthanum-strontium-manganate.

In yet another embodiment of the invention, the metal nanoparticles may be present in an amount of 80 parts by weight to 95 parts by weight based on 100 parts by weight of the organic solvent.

According to the embodiments of the invention, the metal-air fuel cell based on a solid oxide employing metal nanoparticles forms a molten phase of metal at a relatively low temperature to improve contactability and has improved reactivity to promote oxidation, thereby enabling highly efficient power generation.

BRIEF DESCRIPTION OF THE DRAWINGS

The above and other aspects, features, and advantages of the present invention will become apparent from the detailed description of the following embodiments in conjunction with the accompanying drawings, in which:

FIG. 1 is a diagram of a fuel cell according to one embodiment of the present invention;

FIG. 2 is a graph depicting time-related variation of reaction rates of tin nanoparticles according to an inventive example and bulk tin particles, as analyzed by thermogravimetric analysis (TGA);

FIG. 3 shows a table of open circuit voltage (OCV) of fuel cells employing tin nanoparticles according to the inventive example and the bulk tin particles as fuels, respectively; and FIG. 4 is a graph depicting time-related variation of constant current density of the fuel cell employing the tin nanoparticles according to the inventive example.

DETAILED DESCRIPTION

Exemplary embodiments of the present invention will now be described in detail with reference to the accompanying drawings.

The present invention provides a metal-air fuel cell based on a solid oxide employing a metal fuel, which is composed of metal nanoparticles having an average particle diameter of 1 nm to 100 nm and a low melting point to facilitate formation of a molten phase, thereby improving contactability. In addition, with the reduced average nano-scale diameter of the metal particles, the fuel cell provides a high oxidation rate, thereby achieving further improved power generation efficiency.

Referring to FIG. 1, a unit fuel cell according to one embodiment includes a cathode inlet 100; a cathode catalyst 200; an electrolyte 300; an anode catalyst 400; a metal fuel 500; an anode inlet 600; a cell sheath 700; an anode collector 800; a cathode collector 900; and a connecting material 1000.

The metal fuel 500 is a gel phase metal fuel which comprises metal nanoparticles dispersed in an organic solvent, and may be prepared by, for example, mixing ethylene glycol and the metal nanoparticles. However, the present invention is not limited to such an organic solvent or phase, and may be realized in various ways, as needed. That is, the kind of organic solvent or the phase of the metal fuel may be arbitrarily selected according to desired powder, liquid, solid or gel phase fuel by those skilled in the art, as needed.

In the metal fuel 500, the metal nanoparticles have an average particle diameter ranging from 1 nm to 100 nm and thus have a low melting point of 250° C. to 1000° C. Although metal particles have a typical melting point at micro or macro scale, the metal particles exhibit significant reduction in melting point at nano scale. Accordingly, the metal-air fuel cell according to the present embodiment forms a molten phase at a relatively low temperature and exhibits improved contactability with the catalyst. In some embodiments, the metal fuel may be selected from the group consisting of Sn, $V_2O_5$, In, Sb, Pb, Bi, Ag, and mixtures thereof. Particularly, Sn may be used as the metal fuel.

In the metal-air cell according to the embodiment, the anode catalyst 400 may be a porous nickel-gadolinium doped cerium oxide electrode or a porous nickel-yttria stabilized zirconia electrode. In addition, the electrolyte 300 may be yttrium-stabilized zirconia, and the cathode catalyst 200 may be composed of lanthanum-strontium-manganate. However, it should be understood that the present invention is not limited thereto, and may be realized in various ways, as needed.

In one embodiment, the metal nanoparticles may be present in an amount of 80 parts by weight to 95 parts by weight based on 100 parts by weight of the organic solvent.

Next, the present invention will be more clearly understood from the following examples. It should be understood that the following examples are provided for illustration only and are not to be construed in any way as limiting the present invention.

EXAMPLES

Analysis of Reaction Rate According to Particle Diameter

FIG. 2 is a graph comparing temperature-related variation of reaction rates of tin nanoparticles according to an inventive example and bulk tin particles (particle diameter: about 350 μm). Comparison was carried out by thermogravimetric analysis (TGA, TGA-50 A, Shimadzu, Japan) in consideration of mass increase resulting from oxidation. More specifically, the mass change rate was measured in real time while increasing the temperature from 0° C. to 800° C. at a temperature increase rate of 5° C./min and supplying air gas containing 21% $O_2$. As can be seen from FIG. 2, when the average particle diameter of the metal particles was reduced to the range from 1 nm to 100 nm, oxidation occurred at a very high rate even at a lower temperature than the case of using the bulk metal particles.

Open Circuit Voltage (OCV) Analysis According to Particle Diameter

FIG. 3 shows a table of open circuit voltage (OCV) of the fuel cells employing the tin nanoparticles according to the inventive example and the bulk tin particles (particle diameter: about 350 μm) as fuels, respectively. From about 30 minutes before reaction to completion of the reaction, inert gas such as argon or nitrogen was injected into the fuel cell through the anode inlet 600 to stabilize a reaction atmosphere, and air gas containing 21% $O_2$ was injected thereto through the cathode inlet 100. As can be seen from FIG. 3, the fuel cell employing the tin nanoparticles having an average particle diameter of 1 nm to 100 nm had a stable and high OCV, as compared with the fuel cell employing the bulk metal particles, which exhibited a relatively unstable and low OCV.

Analysis Result of Constant Current Density

FIG. 4 is a graph depicting time-related variation in constant current density of the fuel cell employing the tin nanoparticles according to the inventive example. Under typical conditions for operation of a solid oxide fuel cell set to 750° C., inert gas was injected at a rate of 30 mL/min through the anode inlet 600, and air was injected at a rate of 50 mL/min through the cathode inlet 100. The fuel cell prepared in the inventive example stably produced an output power of about 12 mW/cm$^2$ over a long duration after a short stabilization stage.

In the fuel cell prepared in the inventive example, it is considered that Reactions (1) and (2) occurred in the anode catalyst. A solid oxide metal-air fuel cell in the related art requires very high temperature conditions for contact with the anode catalyst due to high melting point of the metal particles. On the contrary, in the fuel cell employing the metal nanoparticles having an average particle diameter of 1 nm to 100 nm as fuel prepared in the inventive example, it is considered that Reaction (1) occurred at low temperature, and Reaction (2) occurred at a very high rate at the same time, thereby allowing the fuel cell to produce high voltage current with stability.

$$Sn(s) \rightarrow Sn(l) \text{ (melt)} \quad (1)$$

$$Sn(l) + 2O^{2-} \rightarrow SnO_2 + 4e^- \text{ (oxidation)} \quad (2)$$

As described above, the fuel cell according to the present invention employs metal particles, which have an average particle diameter of 1 nm to 100 nm and have a lowered melting point and high oxidation reactivity, to secure high contactability using the metal nanoparticles easily melted at a relatively low temperature, thereby reducing resistance between the catalyst and the fuel while continuously producing high voltage current through rapid reaction. In addition, the fuel cell according to the present invention allows the metal nanoparticle fuel to be mixed with an organic solvent or other materials to have a solid, liquid, gel or powdery phase as needed, thereby enabling compatibility.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. A metal-air fuel cell based on a solid oxide electrolyte, comprising:
    an anode;
    a cathode;
    a solid oxide electrolyte; and
    a metal fuel,
    wherein the metel fuel comprises metal nanoparticles dispersed in an organic solvent, the metal nanoparticles having an average particle diameter ranging from 1 nm to 100 nm,
    wherein a melting point of the metal of the metal nanoparticle is lower than a melting point of the metal at micro or macro scale, and
    wherein the metal fuel is a metal selected from the group consisting of Sn, $V_2O_5$, In, Sb, Pb, hi, Ag, and mixtures thereof.

2. The metal-air fuel cell according to claim 1, wherein the metal fuel is a gel phase metal fuel comprising the metal nanoparticles dispersed in an organic solvent.

3. The metal-air fuel cell according to claim 2, wherein the organic solvent is ethylene glycol.

4. The metal-air fuel cell according to claim 2, wherein the metal nanoparticles are present in an amount of 80 parts by weight to 95 parts by weight based on 100 parts by weight of the organic solvent.

5. The metal-air fuel cell according to claim 1, wherein the metal fuel is Sn.

6. The metal-air fuel cell according to claim 1, wherein the anode is a porous nickel-gadolinium doped cerium oxide electrode or a porous nickel-yttria stabilized zirconia electrode.

7. The metal-air fuel cell according to claim 1, wherein the solid oxide electrolyte is yttrium-stabilized zirconia.

8. The metal-air fuel cell according to claim 1, wherein the cathode is composed of lanthanum-strontium-manganate.

9. A metal-air fuel cell based on a solid oxide electrolyte, comprising:
    an anode, wherein the anode is a porous nickel-gadolinium doped cerium oxide electrode or a porous nickel-yttria stabilized zirconia electrode,
    a cathode, wherein the cathode is composed of lanthanum-strontium-manganate,
    a solid oxide electrolyte, wherein the solid oxide electrolyte is yttrium-stabilized zirconia, and
    a metal fuel wherein the metal fuel is Sn,
    wherein the metal fuel comprises metal nanoparticles having an average particle diameter ranging from 1 nm to 100 nm,
    wherein the metal fuel comprises the metal nanoparticles dispersed in an organic solvent, and
    wherein the metal nanoparticles are present in an amount of 80 parts by weight to 95 parts by weight based on 100 parts by weight of the organic solvent.

10. The metal-air fuel cell according to claim 9, wherein the metal fuel is a gel phase metal fuel.

11. A metal-air fuel cell based on a sold oxide electrolyte, comprising:
    an anode;
    a cathode;
    a solid oxide electrolyte; and
    a metal fuel comprising metal nanopartieles dispersed in an organic solvent, the metal nanoparticles configured to be oxidized by oxygen to generate electrons for the metal-air fuel cell,
    wherein the metal nanoparticles have an average particle diameter ranging from 1 nm to 100 nm,
    wherein the metal of the metal nanoparticles is one selected from the group consisting of Sn, In, Sb, Pb, Bi, Ag, and mixtures thereof, and
    wherein a melting point of the metal of the metal nanoparticle is lower than a melting point of the metal at micro or macro scale.

* * * * *